(12) United States Patent
Krokhmal et al.

(10) Patent No.: US 12,078,604 B2
(45) Date of Patent: Sep. 3, 2024

(54) MONITORING PROPERTIES OF X-RAY BEAM DURING X-RAY ANALYSIS

(71) Applicant: BRUKER TECHNOLOGIES LTD., Migdal HaEmek (IL)

(72) Inventors: Alexander Krokhmal, Haifa (IL); Asher Peled, Kfar-Vradim (IL)

(73) Assignee: BRUKER TECHNOLOGIES LTD., Migdal HaEmek (IL)

( * ) Notice: Subject to any disclaimer, the term of this patent is extended or adjusted under 35 U.S.C. 154(b) by 0 days.

(21) Appl. No.: 17/902,926

(22) Filed: Sep. 5, 2022

(65) Prior Publication Data
US 2024/0077437 A1 Mar. 7, 2024

(51) Int. Cl.
G01N 23/223 (2006.01)

(52) U.S. Cl.
CPC ..... *G01N 23/223* (2013.01); *G01N 2223/076* (2013.01); *G01N 2223/3032* (2013.01); *G01N 2223/3037* (2013.01); *G01N 2223/306* (2013.01); *G01N 2223/321* (2013.01); *G01N 2223/6116* (2013.01)

(58) Field of Classification Search
CPC .............. G01N 2223/3032; G01N 2223/3037
See application file for complete search history.

(56) References Cited

U.S. PATENT DOCUMENTS

| | | | | |
|---|---|---|---|---|
| 4,162,528 A * | 7/1979 | Maldonado | .......... | G01N 23/223 378/50 |
| 4,646,341 A * | 2/1987 | Finer | ...................... | G01B 15/02 378/50 |
| 5,060,247 A * | 10/1991 | Watanabe | .............. | G01B 15/02 378/50 |
| 9,612,214 B2 * | 4/2017 | Takahashi | ............ | G01N 23/223 |
| 10,509,000 B2 * | 12/2019 | He | ........................ | G01N 23/223 |
| 11,073,487 B2 * | 7/2021 | Bykanov | .............. | G01N 23/207 |
| 11,248,961 B2 * | 2/2022 | McManus | .............. | G01J 3/443 |
| 2005/0111727 A1 | 5/2005 | Emery | | |
| 2009/0201502 A1 | 8/2009 | Wolf et al. | | |

(Continued)

FOREIGN PATENT DOCUMENTS

DE 102019115794 A1 * 12/2020
JP H1048161 A * 2/1998

(Continued)

*Primary Examiner* — Thomas R Artman
(74) *Attorney, Agent, or Firm* — MEITAR PATENTS LTD.

(57) ABSTRACT

A system for X-ray analysis, includes: (a) an X-ray analysis assembly configured to (i) direct an X-ray beam to impinge on a surface of a sample, and (ii) receive fluorescence radiation excited from the sample in response to the impinged X-ray beam, (b) a target assembly including measurement targets: placed in an optical path between the X-ray analysis assembly and the sample, and configured to move between (i) one or more first positions in which one or more of the measurement targets are positioned in the X-ray beam, and (ii) one or more second positions in which the optical path is unobstructed by the target assembly, and (c) a processor, configured to control movement of the target assembly between the first and second positions, for alternately, (i) monitoring properties of the X-ray beam using the measurement targets, and (ii) performing the X-ray analysis at a measurement site of the sample.

20 Claims, 4 Drawing Sheets

(56) References Cited

U.S. PATENT DOCUMENTS

| | | |
|---|---|---|
| 2009/0279088 A1 | 11/2009 | Fielden et al. |
| 2014/0268133 A1* | 9/2014 | McManus ................. G01J 3/28 356/316 |
| 2015/0243476 A1 | 8/2015 | Lagana-Gizzo et al. |
| 2015/0362445 A1* | 12/2015 | Takahashi ........ G01N 35/00693 378/44 |
| 2016/0341677 A1* | 11/2016 | He ....................... G01N 23/223 |
| 2017/0082932 A1 | 3/2017 | Fu et al. |
| 2018/0328868 A1 | 11/2018 | Bykanov et al. |
| 2018/0347961 A1 | 12/2018 | Fu et al. |
| 2018/0364036 A1 | 12/2018 | Jak et al. |
| 2020/0300790 A1 | 9/2020 | Gellineau et al. |
| 2020/0335406 A1 | 10/2020 | Liman et al. |
| 2021/0003520 A1* | 1/2021 | Kinugasa ............ G01N 23/223 |
| 2021/0055237 A1 | 2/2021 | Shchegrov et al. |
| 2021/0262950 A1 | 8/2021 | Blasenheim et al. |
| 2024/0077437 A1* | 3/2024 | Krokhmal ............ G01N 23/223 |

FOREIGN PATENT DOCUMENTS

| | | | |
|---|---|---|---|
| JP | 2014048274 A * | 3/2014 | ............ G01B 15/02 |
| NL | 2021703 A1 | 10/2018 | |
| WO | 2021122862 A1 | 6/2021 | |
| WO | 2022033717 A1 | 2/2022 | |

\* cited by examiner

MONITORING PROPERTIES OF X-RAY BEAM DURING X-RAY ANALYSIS

FIELD OF THE INVENTION

The present invention relates generally to X-ray analysis, and particularly to methods and systems for monitoring properties of X-ray beams during X-ray analysis.

BACKGROUND OF THE INVENTION

Various techniques for monitoring properties of X-ray beams used in X-ray analysis systems are known in the art.

For example, U.S. Patent Application Publication 2020/0300790 describes methods and systems for characterizing dimensions and material properties of semiconductor devices by full beam x-ray scatterometry. A full beam x-ray scatterometry measurement involves illuminating a sample with an X-ray beam and detecting the intensities of the resulting zero diffraction order and higher diffraction orders simultaneously for one or more angles of incidence relative to the sample. The simultaneous measurement of the direct beam and the scattered orders enables high throughput measurements with improved accuracy.

SUMMARY OF THE INVENTION

An embodiment of the present invention that is described herein provides a system for X-ray analysis, the system includes: (a) an X-ray analysis assembly, which is configured to (i) direct an X-ray beam to impinge on a surface of a sample, and (ii) receive fluorescence radiation excited from the sample in response to the impinged X-ray beam, (b) a target assembly including one or more measurement targets, at least one of the measurement targets being placed in an optical path between the X-ray analysis assembly and the sample, and being configured to move between (i) one or more first positions in which one or more of the measurement targets are positioned in the X-ray beam, and (ii) one or more second positions in which the optical path is unobstructed by the target assembly, and (c) a processor, which is configured to control movement of the target assembly between the first positions and the second positions, for alternately (i) monitoring properties of the X-ray beam using the measurement targets, and (ii) performing the X-ray analysis at a measurement site of the sample.

In some embodiments, the X-ray analysis assembly includes (i) an X-ray source configured to direct the X-ray beam to impinge on the surface of the sample, and (ii) a detector sub-assembly configured to receive the fluorescence radiation excited from the sample in response to the impinged X-ray beam. In other embodiments, the target assembly includes a substrate, and the one or more measurement targets are disposed on one or more sections of the substrate. In yet other embodiments, the target assembly has one or more openings formed between the one or more sections of the substrate.

In some embodiments, at the one or more first positions, the X-ray beam impinges on at least one of the one or more sections of the substrate, and at the one or more second positions, the X-ray beam passes through one of the openings and impinges on the measurement site. In other embodiments, the target assembly includes a motor, which is configured to rotate the substrate about an axis between the first and second positions. In yet other embodiments, the target assembly includes a motor, which is configured to move the substrate along an axis between the first and second positions, and the target assembly has one or more openings formed between the one or more sections of the substrate.

In some embodiments, based on the monitoring properties of the X-ray beam, the processor is configured to control the X-ray analysis assembly to adjust the properties of the X-ray beam directed to the surface of the sample. In other embodiments, at least one of the measurement targets includes: (i) a first substrate similar to a second substrate of the sample, and (ii) at least a layer disposed on the first substrate and having a thickness larger than 0.3 mm. In yet other embodiments, the at least one of the measurement targets includes an additional layer disposed over the layer and having a thickness smaller than 1000 nanometers.

There is additionally provided, in accordance with an embodiment of the present invention, a method including, directing an X-ray beam to impinge on a surface of a sample. Movement of a target assembly is controlled, the target assembly has one or more measurement targets between (i) one or more first positions, in which one or more of the measurement targets are positioned in an optical path between the X-ray beam and the sample, and (ii) one or more second positions, in which the optical path is unobstructed by the target assembly. Fluorescence radiation that is excited from one or more of the measurement targets, or from the sample, in response to the impinged X-ray beam, is received. Based on the movement of the target assembly and the fluorescence radiation, alternately, (i) properties of the X-ray beam are monitored using the measurement targets, and (ii) X-ray analysis is performed at a measurement site of the sample.

The present invention will be more fully understood from the following detailed description of the embodiments thereof, taken together with the drawings in which:

DETAILED DESCRIPTION OF EMBODIMENTS

Overview

Figure 1:
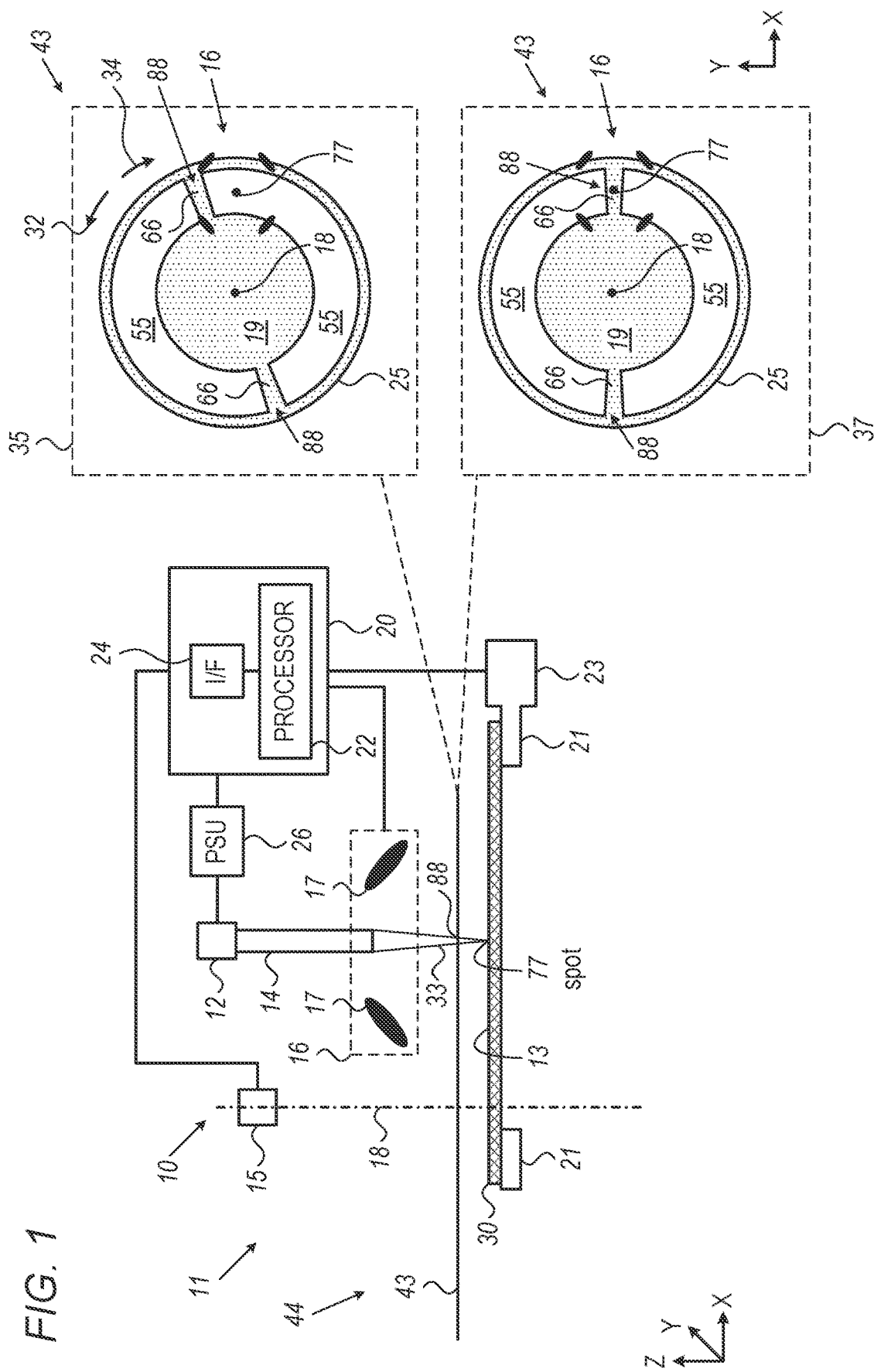
FIG. 1 is a schematic, side view of an X-ray analysis system, in accordance with an embodiment of the present invention.

Measurement and analysis of semiconductor devices using an X-ray analysis system typically requires tight control of the X-ray beam properties, such as beam intensity. In principle, it is possible to conduct a periodic test of the properties using various types of measurement targets. For example, a semiconductor wafer (or any other suitable type of sample), is placed on a chuck of a movable stage, and the measurement targets are positioned on the stage, near the chuck. In this configuration, the stage is placed at one or more first positions, such that the X-ray beam is directed toward the measurement targets for measuring the beam properties. Subsequently, the stage moves to one or more second positions, such that the beam is directed to the wafer for performing X-ray analysis at one or more measurement sites, respectively, on the wafer. This movement between the first and second positions is carried out alternately for performing the beam monitoring and the X-ray analysis on the wafer, respectively. Note that this technique requires alternating movements of the stage between the first and second positions, and therefore, reduces the throughput of the X-ray analysis system. In the context of the present disclosure and in the claims, the term "throughput" refers to the average number of measurement sites of the wafer undergoing X-ray analysis in an hour (or any other predefined time interval). Thus, at least while alternatingly moving the stage between the first and second positions, the system does not perform X-ray analysis, and therefore, the throughput is reduced.

Embodiments of the present disclosure that are described hereinbelow provide techniques for maintaining high throughput of an X-ray analysis system while monitoring properties of an X-ray beam at any required frequency.

In some embodiments, a system for X-ray analysis (also referred to herein as a system, for brevity) comprises an X-ray analysis assembly having at least: (i) an X-ray source configured to direct an X-ray beam to impinge on a surface of a sample (in the present example, a semiconductor wafer having layers and structures formed thereon), and (ii) a detector sub-assembly configured to receive fluorescence radiation excited from the sample in response to the impinged X-ray beam.

In some embodiments, the system comprises a target assembly having one or more measurement targets formed thereon. At least one of the measurement targets may be placed in an optical path between the X-ray analysis assembly and the sample. In some embodiments, the target assembly is configured to be moved between (i) one or more first positions in which at least one of the measurement targets is positioned between the X-ray analysis assembly and the wafer, such that the X-ray beam impinges on at least one of the measurement targets, and (ii) one or more second positions in which the optical path is unobstructed by the target assembly, and the X-ray beam impinges on the wafer surface.

In one implementation, the target assembly comprises a rotatable substrate having one or more sections comprising the measurement targets, and one or more openings between the sections of the measurement targets. The target assembly further comprises a motor configured to rotate the substrate (having the targets) about a rotation axis, so as to alternately move the target assembly between the first and second positions described above.

In another implementation, the target assembly comprises a substrate having the measurement targets formed thereon, a bar coupled to the substrate, and a motor or actuator configured to move the bar and the substrate along an axis between the first and second positions.

In some embodiments, the system comprises a processor, which is configured to control the movement of the target assembly between the first positions and the second positions, for alternately (i) monitoring properties (e.g., intensity) of the X-ray beam using the measurement targets, and (ii) performing the X-ray analysis at one or more measurement sites of the sample.

The disclosed techniques enable monitoring properties of the X-ray beam without moving the stage (for monitoring the beam properties), and therefore, improve the stability monitoring of the X-ray beam, reduce the time required for the beam monitoring, and improve the throughput of the X-ray analysis system.

System Description

FIG. 1 is a schematic, side view of an X-ray analysis system 11, in accordance with an embodiment of the present invention.

In some embodiments, system 11 comprises an X-ray fluorescence (XRF) analysis system, but at least some of the embodiments described in the present disclosure are applicable, mutatis mutandis, to other sorts of X-ray analysis systems, and to other sorts of systems used for analyzing and/or processing semiconductor-based samples during very large-scale integration (VLSI) processes for producing integrated circuit (IC) devices.

In some embodiments, system 11 comprises an X-ray source 12 configured to receive power from a power supply unit (PSU) 26 and to emit an X-ray beam 33 toward a sample 30, in the present example a silicon wafer having layers and structures that are patterned using any suitable VLSI processes.

In some embodiments, system 11 comprises X-ray optics 14 disposed between source 12 and sample 30 and configured to shape beam 33 so as to form a shaped spot 77, e.g., at a predefined measurement site on an upper surface 13 of sample 30.

In some embodiments, system 11 comprises an X-ray detector sub-assembly (XDSA) 16 comprising one or more (and in the present example four) detectors 17 configured to receive fluorescence radiation excited from sample 30 in response to the interaction between sample 30 and X-ray beam 33 impinged thereon.

In some embodiments, X-ray source 12, X-ray optics 14 and XDSA 16 reside in a vacuum chamber, and a combination thereof is referred to herein as an X-ray analysis assembly 10 in the context of the present disclosure.

In some embodiments, system 11 comprises a target assembly 44, having a controlled motor 15 and a substrate 43 (made from aluminum, or stainless steel or any other suitable material, such as diamond produced using chemical vapor deposition (CVD) process, or a suitable type of X-ray resistant polymer) comprising one or more measurement targets 88 mounted or formed thereon. In some embodiments, motor 15 is configured to move substrate 43 along one or more axes relative to X-ray beam 33. In the present example, motor 15 is configured to rotate substrate 43 about a rotation axis 18, which is orthogonal to an XY plane of an XYZ coordinate system of system 11. In other embodiments, substrate 43 may be moved along the X-axis and/or along the Y-axis of the XYZ coordinate system as will be described in detail below.

In some embodiments, at least targets 88 (and typically all the components of target assembly 44) are disposed in the optical path between the X-ray analysis assembly 10 and sample 30 along the Z-axis of the XYZ coordinate system. Targets 88 are adapted for monitoring properties, such as but not limited to intensity, of X-ray beam 33.

In some embodiments, system 11 comprises a computer 20, which comprises a processor 22, an interface 24 and a display (not shown). Processor 22 is configured to control various components and assemblies of system 11 described below, and to process electrical signals received from detectors 17. Interface 24 is configured to exchange electrical signals between processor 22 and the respective components and assemblies of system 11.

Typically, processor 22 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

In some embodiments, system 11 comprises a chuck 21 having sample 30 mounted thereon. Chuck 21 is configured to mechanically support sample 30 and to allow directing beam 33 to most of the area, or over the entire area of surface 13.

In some embodiments, chuck 21 may comprise a ring-shaped sample support, but additionally or alternatively, chuck 21 may comprise any other suitable design, such as a three-point kinematic mount.

In some embodiments, system 11 comprises a mount, for example, a motorized xyzp-stage, referred to herein as "a stage 23," having chuck 21 mounted thereon. Stage 23 is controlled by processor 22 in the XYZ coordinate system of system 11, and is designed to allow incident beam 33 to directly impinge on surface 13 of sample 30.

Reference is now made to an inset 35 showing a top view of substrate 43 of target assembly 44.

Figure 2:
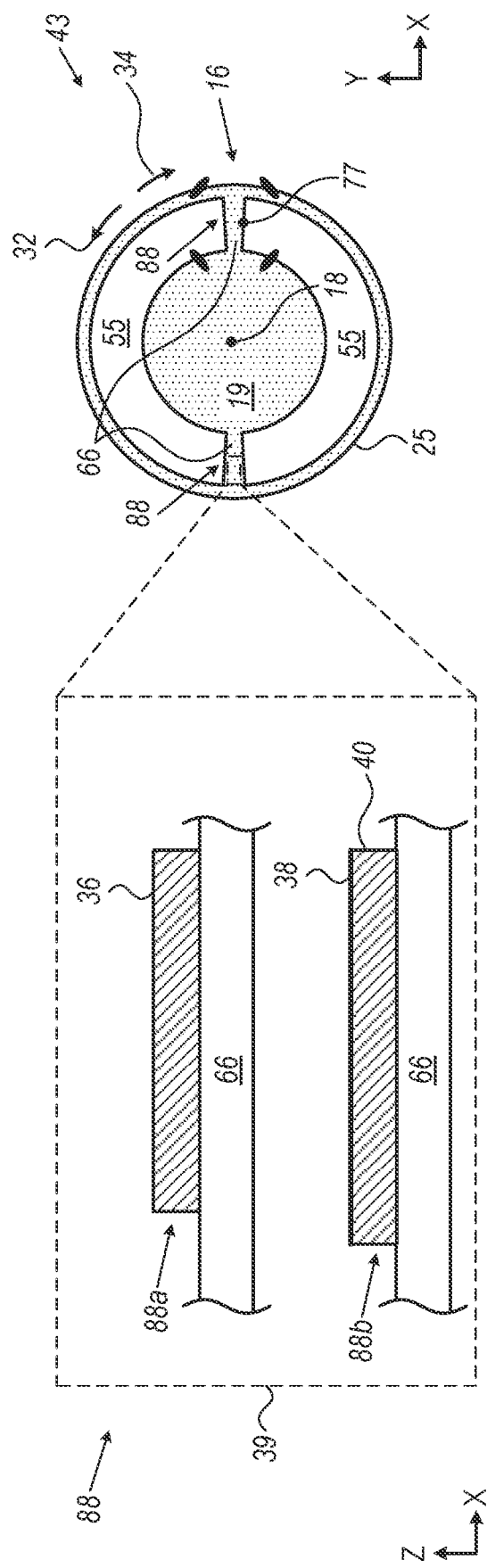
FIG. 2 is a schematic, top view of an assembly for X-ray beam monitoring and X-ray analysis implemented in FIG. 1, in accordance with an embodiment of the present invention.

In some embodiments, substrate 43 comprises sections 66 having targets 88 formed in and/or mounted on sections 66. In the example of FIGS. 1 and 2, substrate 43 has two sections 66, but in other embodiments, substrate 43 may have any other suitable number of sections 66, larger than two. For example, four sections that also improve the mechanical stiffness of substrate 43, and also allow the use of additional targets 88. Example implementations of targets 88 are described in FIG. 2 below. Substrate 43 has openings 55 surrounded by sections 66, an outer ring 25 and a section 19 of substrate 43. Note that in the present example section 66 is connecting between section 19 and ring 25, but in other embodiments, section 66 may have any other suitable geometrical size and shape.

In the example implementation of FIG. 1, motor 15 comprises a rotation motor configured to rotate substrate 43 about axis 18. The rotation may be carried out: (i) counterclockwise, e.g., in a direction 32, (ii) clockwise, e.g., in a direction 34, and (iii) a combination thereof, e.g., back and forth rotation in directions 32 and 34. The rotation speed and the frequency of the back-and-forth rotation is determined by the stability of beam 33 and by the X-ray analysis application.

In the example of inset 35, processor 22 is configured to control motor 15 to rotate substrate 43 about axis 18, such that the optical path of beam 33 is unobstructed by substrate 43 of target assembly 44. In other words, beam 33 passes through opening 55 and impinges, as spot 77, on surface 13 of sample 30 for performing X-ray analysis at a measurement site of sample 30. In response to X-ray beam 33 being impinged on surface 13, XDSA 16 is configured to receive fluorescence radiation excited from sample 30, and produces a first signal indicative of the X-ray photons emitted from surface 13 during the X-ray analysis. Based on the first signal, processor 22 is configured to perform the X-ray analysis at the measurement site of sample 30.

Reference is now made to an inset 37 showing a top view of substrate 43 of target assembly 44. In the example of inset 37, processor 22 is configured to control motor 15 to rotate substrate 43 about axis 18, such that the optical path of beam 33 is obstructed by section 66 of substrate 43. As shown in inset 37, spot 77 falls on section 66 and beam 33 impinges on one of targets 88. In response to X-ray beam 33 being impinged on one of targets 88, XDSA 16 is configured to receive fluorescence radiation excited from sample 30 and from targets 88, and produces a signal indicative of the intensity and/or other properties of beam 33. Based on the signal, processor 22 is configured to monitor the intensity and/or other properties of beam 33, e.g., relative to respective thresholds.

Reference is now made back to the general view of FIG. 1. In some embodiments, based on the positions of spot 77 relative to the sections of substrate 43, as shown in insets 35 and 37, processor 22 is configured to alternately: (i) monitor properties of X-ray beam 33 using measurement targets 88, and (ii) perform the X-ray analysis at the one or more measurement sites of sample 30. Moreover, the disclosed technique improves the throughput of the X-ray analysis measurements because the X-ray analysis is carried out while monitoring the properties of X-ray beam 33.

In some embodiments, in case the stability of beam 33 is relatively low, for example, fluctuations of the flux of the X-ray photons are larger than about 0.1% within a predefined time interval, processor 22 may control motor 15 to rotate substrate 43 at a rotational speed of about 60 rounds per minute (RPM) so as to monitor the intensity of beam 33 every approximately 1 second for each target. In other embodiments, in case of higher stability of beam 33, beam intensity monitoring may be required, for example, every ten minutes or every one hour. In such embodiments, from the arrangement shown in inset 37, processor 22 may control motor 15 to: (i) rotate substrate 43 by about 10° or 20° in direction 32 to obtain the arrangement shown in inset 35 for performing X-ray analysis at one or more measurement sites of sample 30 for about ten minutes or one hour, and subsequently, (ii) rotate substrate 43 by about 10° or 20° in direction 34 to reobtain the arrangement shown in inset 37 for monitoring the intensity (as well as other properties) of beam 33. Note that the intensity monitoring may require approximately between about 1% and 5% of the total time required for each sample to undergo X-ray analysis using system 11 (depending on the application and number of measurement sites). In other words, the number of measurement site undergoing X-ray analysis per hour is almost identical to that without the monitoring of beam 33.

In the context of the present disclosure and in the claims, the terms "about" or "approximately" for any numerical values or ranges indicate a suitable dimensional tolerance that allows the part or collection of components to function for its intended purpose as described herein.

In alternative embodiments, instead of rotating substrate 43 back and forth (e.g., in directions 32 and 34), processor may control the rotation speed of substrate 43 so that after ten minutes (for example) substrate 43 completes about 180° and beam 33 impinges on the next section 66 for monitoring the intensity (and other properties) thereof.

In other embodiments, processor 22 is configured to control the rotation of substrate 43 using any suitable motion profile other than the above examples.

This particular configuration of system 11 and target assembly 44 are shown by way of example, in order to illustrate certain problems that are addressed by embodiments of the present invention and to demonstrate the application of these embodiments in enhancing the performance of such a system. Embodiments of the present invention, however, are by no means limited to this specific sort of example system and/or target assembly, and the principles described herein may similarly be applied to other sorts of X-ray analysis systems and other configurations of target assemblies.

FIG. 2 is a schematic, top view of substrate 43 of assembly rotated relative to spot 77, in accordance with an embodiment of the present invention.

In some embodiments, the size of each of targets 88a and 88b in X- and Y-axes is about 4 mm by 4 mm, but in other embodiments at least one of targets 88a and 88b may have a geometry other than square and/or a different size. Moreover, in some embodiments, targets 88a and 88b are typically arranged along the tangential axis of substrate 43, in the example of FIG. 2, along the Y-axis of section 66. In this configuration, processor 22 can control the position of spot 77 over the target of interest by rotating substrate 43 about axis 18.

Reference is now made to an inset 39 showing a sectional view of targets 88a and 88b disposed on the surface of section 66. In some embodiments, the thickness of substrate 43 at section 66 is between about 0.3 mm and 1.5 mm along the Z-axis. Note that substrate 43 must be sufficiently thin, so that targets 88 (mounted on substrate 43) can be fitted between X-ray analysis assembly 10 and surface 13 of sample 30, and yet, enable the monitoring of the properties of beam 33 and the X-ray analysis of the measurement sites of sample 30 as described in FIG. 1 above.

In some embodiments, target 88a comprises a layer 36 having a thickness (along the Z-axis) of about 0.7 mm or any other suitable thickness, e.g., larger than about 0.3 mm. Layer 36 typically comprises silicon (or any other suitable material, such as a metallic layer), which is the same material of sample 30, or any other suitable material. Note that the thickness of layer 36 is larger than the penetration depth of beam 33, and therefore, target 88a is also referred to herein as an infinite target. In this configuration, in response to impinging beam 33 on layer 36, detectors 17 of XDSA 16 receive fluorescence radiation excited solely from layer 36, and based on the signals produced by XDSA 16, processor 22 estimates the intensity and/or other properties of beam 33.

In some embodiments, target 88b comprises a layer 40, which may have the same features (e.g., material and thickness) of layer 36. Target 88b further comprises a layer 38, which is disposed over layer 40, and the properties of layer 38 (e.g., thickness and material) depend on the X-ray analysis application. Thus, layer 38 may have any suitable thickness between a few Angstroms and several hundreds of nanometers, and anyway the thickness is smaller than about 1000 nanometers. Moreover, layer 38 may comprise the materials disposed on sample 30, such as but not limited to copper, germanium, cobalt, silver, titanium or any other suitable materials in accordance with the structures formed on sample 30 and/or in accordance with the application determined by the owner of sample 30. In this configuration, in response to impinging beam 33 on layer 36, detectors 17 of XDSA 16 receive fluorescence radiation excited from layers 38 and 40, and based on the signals produced by XDSA 16, processor 22 estimates the intensity and/or other properties of beam 33, and the interaction between beam 33 and layers 38 and 40.

Reference is now made back to the general view of FIG. 2. In some embodiments, while substrate 43 rotates about axis 18 (e.g., along one or both directions 32 and 34), spot 77 falls on the edge of section 66 and the excited fluorescence radiation is received by XDSA 16, but this radiation must be filtered out because it does not represent the fluorescence radiation excited from any of sample 30 or targets 88. One implementation of a method for filtering out this radiation, is described herein in FIG. 3 below.

Figure 3:
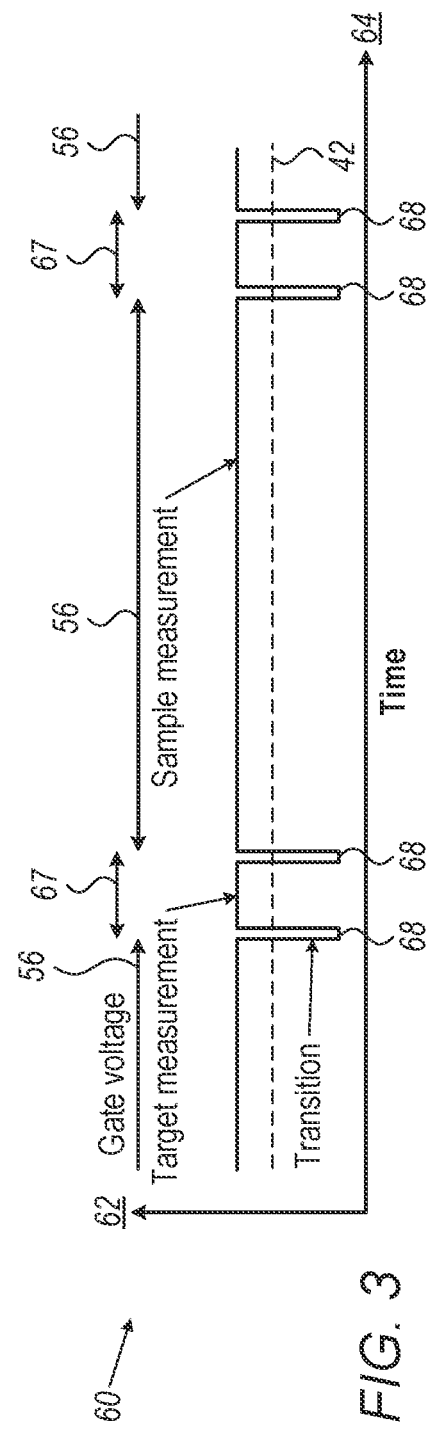
FIG. 3 is a graph a signal, which is received from a processor of the system of FIG. 1, and is indicative of the position of a substrate of a target assembly relative to the X-ray beam, in accordance with an embodiment of the present invention.

FIG. 3 is a graph 60 illustrating a signal, which is received from processor 22 and is indicative of the position of substrate 43 relative to X-ray beam 33, in accordance with an embodiment of the present invention.

In some embodiments, one or more algorithms for controlling the motion of substrate 43 are implemented in processor 22.

In some embodiments, graph 60 comprises an axis 64 representing the time in which processor 22 produces signals indicative of the position of sections 55 and 66, relative to X-ray beam 33. Graph 60 further comprises an axis 62, which is the voltage of the signals (indicative of the position of sections 55 and 66, relative to X-ray beam 33) produced by processor 22 (as a function of the time shown along axis 64).

In the present example, graph 60 has sections 67 and 56 that are indicative of the time intervals in which X-ray beam 33 impinges on sections 66 and 55, respectively. Sections 68 of graph 60 represent transition areas between sections 67 and 56.

In some embodiments, by applying a threshold 42 the voltages of section 68 may be filtered out by processor 22. Threshold 42 may be implemented using a high-pass filter of the voltage, or using any other suitable technique.

In some embodiments, the X-ray fluorescence received in response to beam 33 impinged on targets 88 may be used to compensate for the metrology measurements (e.g., X-ray analysis at the measurement sites) when the properties of X-ray beam 33 is varying. The properties may comprise the intensity of beam 33, the wavelength spectrum of beam 33, and other properties. For example, the measured intensity $I_m$ for metrology is corrected to be $I_c$ (the corrected intensity) by the ratio of the signal of the X-ray fluorescence received from targets 88 (also referred to herein as drift monitor) at time t=0 when the measurement starts and some later time t where the drift monitor intensity is $I_d(t)$ such that: $I_c=I_m \times I_d(t=0)/I_d(t)$. The intensity of the drift monitor, $I_d$, should be significantly greater (e.g., 10 times greater) than the measured intensity for the X-ray fluorescence received from sample 30 (also referred to herein as metrology intensity $I_m$), so as not to introduce uncertainties from statistical sampling.

In some embodiments, based on the monitoring properties of X-ray beam 33, processor 22 is configured to control X-ray analysis assembly 10 to adjust the properties of X-ray beam 33, which is directed to surface 13 for performing X-ray analysis at measurement sites of sample 30. In such embodiments, processor 22 is configured to control X-ray analysis assembly 10 to control the properties of X-ray beam 33 using several parameters. For example, (i) adjusting the current supplied from PSU 26 to X-ray source 12, (ii) adjusting the time interval in which X-ray beam 33 impinges on targets 88 of section 66, and (iii) store beam parameters information in a results file, and use the results file for analyzing the X-ray fluorescence received from sample 30 during the processing of the measurement results at the measurement sites.

Figure 4:
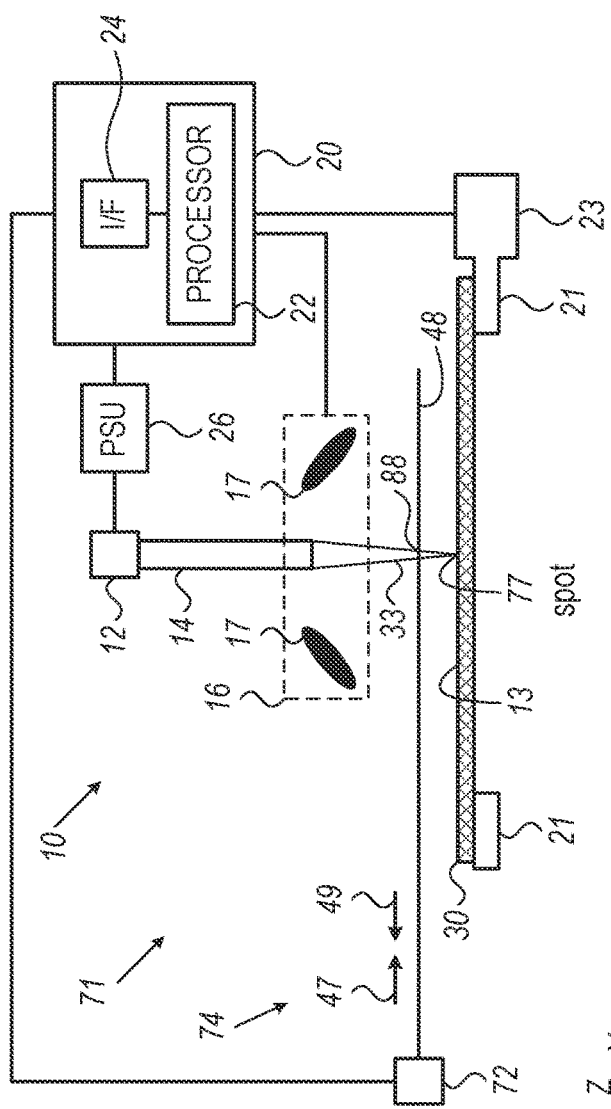
FIG. 4 is a schematic, side view of an X-ray analysis system, in accordance with another embodiment of the present invention.

FIG. 4 is a schematic, side view of an X-ray analysis system 71, in accordance with another embodiment of the present invention.

In some embodiments, system 71 is similar to system 11 of FIG. 1 above, but has a target assembly 74 different from target assembly 44 described above.

In some embodiments, target assembly 74 comprises a substrate 48 (shown and described in detail in FIG. 5 below)

having targets 88 mounted thereon (or formed therein), and a motor 72 configured to move substrate 48 in directions 47 and 49, e.g., parallel to the X-axis of the XYZ coordinate system.

In such embodiments, when substrate 48 is moved in direction 47 beam 33 impinges on targets 88, and when substrate 48 is moved in direction 49, substrate 48 is not positioned in the optical path between X-ray analysis assembly 10 (e.g., X-ray source 12 and XDSA 16) and sample 30, so that beam 33 impinges on surface 13 of sample 30 and detectors 17 receive the fluorescence radiation excited from sample 30.

Figure 5:
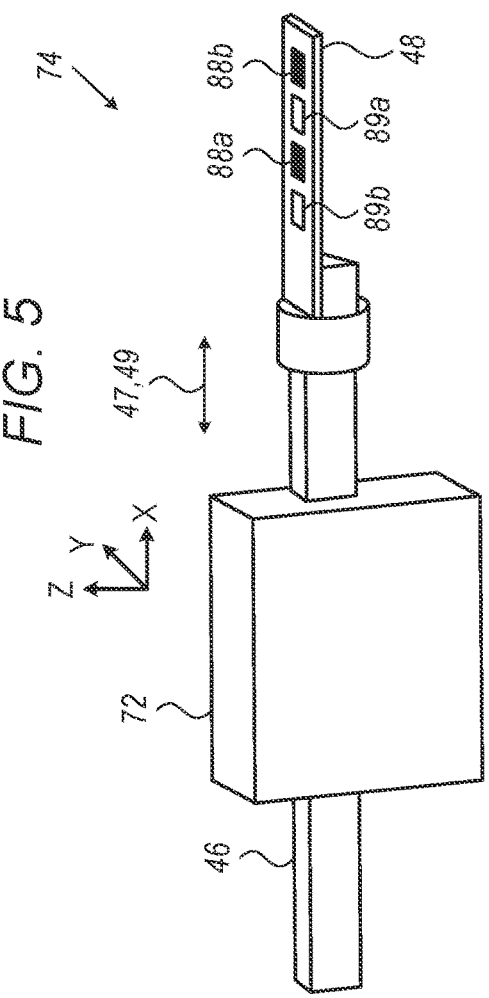
FIG. 5 is a schematic, pictorial illustration of an assembly for X-ray beam monitoring and X-ray analysis implemented in FIG. 4, in accordance with an embodiment of the present invention.

FIG. 5 is a schematic, pictorial illustration of target assembly 74, in accordance with an embodiment of the present invention.

In some embodiments, target assembly 74 comprises targets 88*a* and 88*b* (described in detail in FIG. 4 above) that in the present example, are arranged along the X-axis of substrate 48 (but in other embodiments, may have any suitable arrangement).

In some embodiments, substrate 48 may have similar thickness and material to that of at least section 66 of substrate 43, as described in FIG. 2 above.

In some embodiments, motor 72 comprises an actuator, which is configured to move a bar 46, which is connected to substrate 48, along the Z-axis in directions 47 and 49 described in FIG. 4 above. In other embodiments, motor 72 may move substrate 48 using any other suitable technique, for example, without having bar 46 therebetween.

In some embodiments, substrate 48 has openings 89*a* and 89*b* that correspond to openings 55 of substrate 43 shown in FIGS. 1 and 2 above. In such embodiments, when substrate 48 is moved in directions 47 and/or 49, beam 33 may pass through openings 89, so as to enable X-ray analysis of the measurement sites of sample 30, using the same technique described in inset 35 of FIG. 1 above.

In other embodiments, substrate 48 may not have openings 89*a* and 89*b*, and the properties of beam 33 may be monitored after verifying that target 88*a* or target 88*b* is positioned in the optical path between beam 33 and sample 30. The verification may be carried out using any suitable type of motion control assembly having means for identifying the position of targets 88*a* and 88*b* and a motion control algorithm, which may be implemented as a software module in processor 22 or in any other controller (not shown) configured.

Additionally, or alternatively, motor 72 is configured to move substrate 48 along the Y-axis, so as to position target 88*a* or target 88*b* in the optical path between beam 33 and sample 30.

Figure 6:
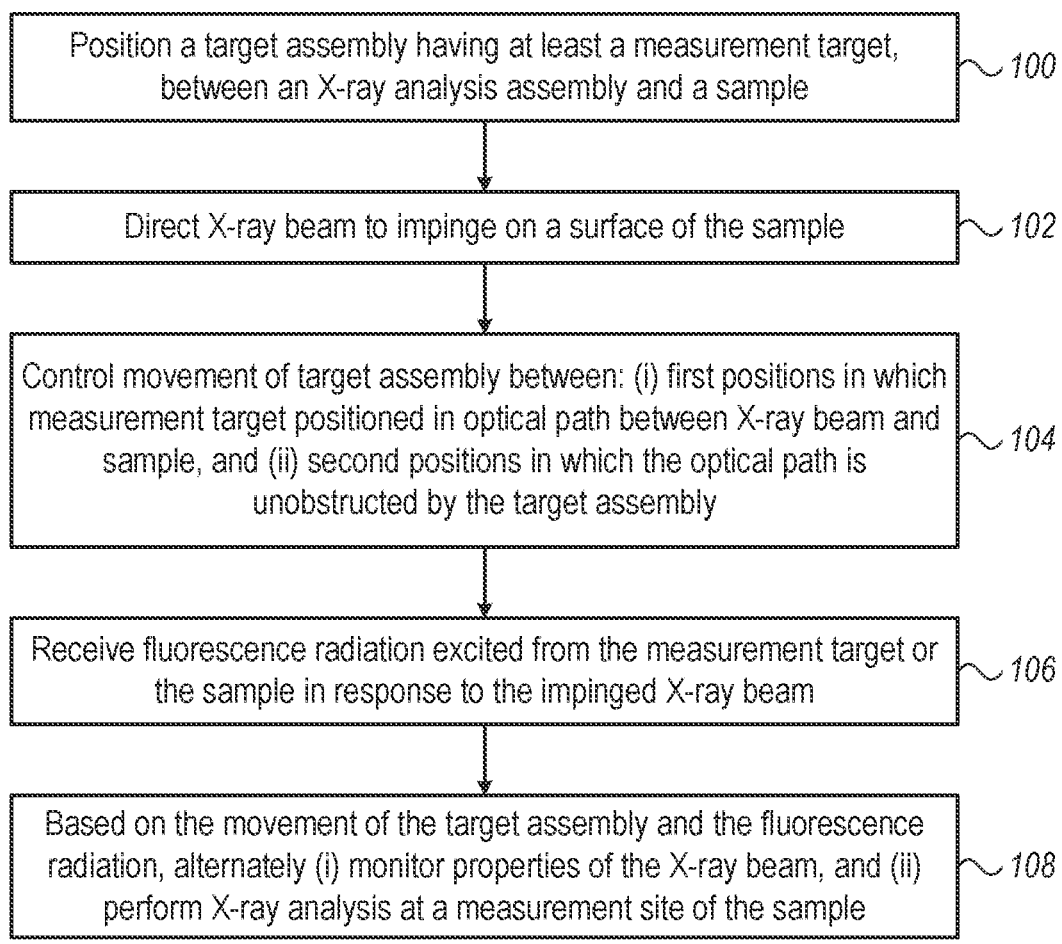
FIG. 6 is a flow chart that schematically illustrates a method for alternately performing X-ray beam monitoring and X-ray analysis, in accordance with an embodiment of the present invention.

FIG. 6 is a flow chart that schematically illustrates a method for alternately performing X-ray beam monitoring and X-ray analysis, in accordance with an embodiment of the present invention.

In some embodiments, the method of FIG. 6 is applied to system 11 of FIG. 1 above, but the principles of the method may be applied, mutatis mutandis, to system 71 of FIG. 4 above.

The method begins at a target assembly positioning step 100, with positioning target assembly 44 between X-ray analysis assembly 10 and sample 30, as shown and described in detail in the configuration of FIG. 1 above. At a beam directing step 102, X-ray beam 33 is directed to impinge on surface 13 of sample 30, as shown and described in detail in the configuration of FIG. 1 above.

At a target assembly movement step 104, processor 22 controls the movement of one or more components of target assembly 44 between (i) one or more first positions, in which measurement target 88*a* or 88*b* is positioned in the optical path between X-ray beam 33 and sample 30, and (ii) one or more second positions, in which the optical path is unobstructed by target assembly 44. In the example of FIG. 1, processor 22 controls motor 15 to rotate substrate 43 about axis 18, so that: (i) in the one or more first positions measurement target 88*a* or 88*b* (disposed on section 66 of substrate 43) is positioned in the optical path between X-ray beam 33 and sample 30 and spot 77 falls on the respective measurement target, and (ii) in the one or more second position, X-ray beams 33 passes through opening 55 and spot 77 falls on the measurement site on surface 13 of sample 30. The first and second positions are shown and described in detail in FIG. 1 above.

Note that in the example configuration of system 71 shown in FIG. 4 above and target assembly 74 shown in FIG. 5 above, processor 22 controls motor 72 to move substrate 48 along directions 47 and 49. Thus, in the one or more first positions, measurement target 88*a* or 88*b* is positioned in the optical path between X-ray beam 33 and sample 30, and in the one or more second positions, X-ray beams 33 passes through opening 89*a* or 89*b* (or substrate 48 is moved away from beam 33) so that spot 77 falls on the measurement site of sample 30.

At a detection step 106, in response to the impinged X-ray beam 33, detectors 17 of XDSA 16 receive the fluorescence radiation excited from the respective measurement target 88 or from the measurement site of sample 30, and XDSA 16 produces one or more signals indicative of the detected fluorescence radiation, as described in detail in FIG. 1 above.

It is noted that because the fluorescence radiation is emitted immediately in response to the impinged X-ray beam 33, the positioning of target assembly 44 is carried out before directing X-ray beam 33, but for the sake of conceptual clarity step 100 precedes step 102.

At a beam monitoring and sample analyzing step 108 that conclude the method, the properties (e.g., intensity) of beam 33 are measured using one or both targets 88*a* and 88*b*, and alternately, X-ray analysis is performed at measurement sites of sample 30. As described in detail in FIG. 1 above, the beam monitoring and the X-ray analysis are performed based on the movement of target assembly 44 between the first and second positions, and the fluorescence radiation detected when target assembly 44 is located at the first and second positions, respectively.

This particular method of FIG. 6 is simplified and shown by way of example, in order to illustrate certain problems that are addressed by embodiments of the present invention and to demonstrate the application of these embodiments in enhancing the performance of such a method for alternately and concurrently performing (i) the X-ray analysis at the measurement sites, and (ii) monitoring the properties of X-ray beam 33. Embodiments of the present invention, however, are by no means limited to this specific sort of example method, and the principles described herein may similarly be applied to other sorts of X-ray analysis systems and other configurations of target assemblies.

Although the embodiments described herein mainly address X-ray fluorescence (XRF) analysis of semiconductor wafers, the methods and systems described herein can also be used in other applications, such as in any analytics based on measurements of reflected and/or scattered and/or emitted radiation of photons, electrons, and ions produced by an incident primary beam.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for X-ray analysis, the system comprising:
an X-ray analysis assembly, which is configured to (i) direct an X-ray beam to impinge on a surface of a sample, and (ii) receive fluorescence radiation excited from the sample in response to the impinged X-ray beam;
a target assembly comprising one or more measurement targets, at least one of the measurement targets being placed in an optical path between the X-ray analysis assembly and the sample, the target assembly being configured to move between (i) one or more first positions in which one or more of the measurement targets are positioned in the X-ray beam, (ii) one or more second positions in which the optical path is unobstructed by the target assembly, and (iii) at least a transition area between one of the first positions and one of the second positions; and
a processor, which is configured to (a) control movement of the target assembly between the first positions and the second positions, for alternately (i) monitoring properties of the X-ray beam using the measurement targets, and (ii) performing the X-ray analysis at a measurement site of the sample, and (b) exclude, from the X-ray analysis and from the monitoring of the properties, the fluorescence radiation excited from the transition area.

2. The system according to claim 1, wherein the X-ray analysis assembly comprises (i) an X-ray source configured to direct the X-ray beam to impinge on the surface of the sample, and (ii) a detector sub-assembly configured to receive the fluorescence radiation excited from the sample in response to the impinged X-ray beam.

3. The system according to claim 1, wherein the target assembly comprises a substrate, and wherein the one or more measurement targets are disposed on one or more sections of the substrate.

4. The system according to claim 3, wherein the target assembly has one or more openings formed between the one or more sections of the substrate.

5. The system according to claim 4, wherein at the one or more first positions, the X-ray beam impinges on at least one of the one or more sections of the substrate, and at the one or more second positions, the X-ray beam passes through one of the openings and impinges on the measurement site.

6. The system according to claim 3, wherein the target assembly comprises a motor, which is configured to rotate the substrate about an axis between the first and second positions.

7. The system according to claim 3, wherein the target assembly comprises a motor, which is configured to move the substrate along an axis between the first and second positions, and wherein the target assembly has one or more openings formed between the one or more sections of the substrate.

8. The system according to claim 1, wherein, based on the monitoring properties of the X-ray beam, the processor is configured to control the X-ray analysis assembly to adjust the properties of the X-ray beam directed to the surface of the sample.

9. The system according to claim 1, wherein the X-ray analysis assembly is configured to produce a voltage in response to receiving the fluorescence radiation, and wherein the processor is configured to exclude the fluorescence radiation excited from the transition area by applying a high-pass filter to the produced voltage.

10. The system according to claim 1, wherein in response to the monitored properties of the X-ray beam, the processor is configured to adjust a time interval in which the one or more of the measurement targets are positioned in the X-ray beam.

11. A method, comprising:
directing an X-ray beam to impinge on a surface of a sample;
controlling movement of a target assembly having one or more measurement targets between (i) one or more first positions in which one or more of the measurement targets are positioned in an optical path between the X-ray beam and the sample, (ii) one or more second positions in which the optical path is unobstructed by the target assembly, and (iii) at least a transition area between one of the first positions and one of the second positions; receiving fluorescence radiation excited from one or more of the measurement targets or the sample in response to the impinged X-ray beam; and
based on the movement of the target assembly and the fluorescence radiation, alternately (i) monitoring properties of the X-ray beam using the measurement targets, (ii) performing X-ray analysis at a measurement site of the sample, and (iii) excluding, from the X-ray analysis and from the monitoring of the properties, the fluorescence radiation excited from the transition area.

12. The method according to claim 11, wherein directing the X-ray beam comprises applying an X-ray source for directing the X-ray beam to impinge on the surface of the sample, and wherein receiving the fluorescence radiation comprises applying a detector sub-assembly for receiving the fluorescence radiation excited from the sample in response to the impinged X-ray beam.

13. The method according to claim 11, wherein the target assembly comprises a substrate, and wherein the one or more measurement targets are disposed on one or more sections of the substrate.

14. The method according to claim 13, wherein the target assembly has one or more openings formed between the one or more sections of the substrate.

15. The method according to claim 14, wherein controlling the movement comprises that: (i) at the one or more first positions, the X-ray beam impinges on at least one of the one or more sections of the substrate, and (ii) at the one or more second positions, the X-ray beam passes through one of the openings and impinges on the measurement site.

16. The method according to claim 13, wherein controlling the movement of a target assembly comprises rotating the substrate about an axis between the first and second positions.

17. The method according to claim 13, wherein controlling the movement of a target assembly comprises moving the substrate along an axis between the first and second positions, and wherein the target assembly has one or more openings formed between the one or more sections of the substrate.

18. The method according to claim 11, and comprising, based on the monitoring properties of the X-ray beam, directing the X-ray beam comprises adjusting the properties of the X-ray beam directed to the surface of the sample.

19. The method according to claim 11, and comprising, producing a voltage in response to receiving the fluorescence radiation excited from one or more of the measurement targets or the sample, and wherein excluding the fluorescence radiation excited from the transition area comprises applying a high-pass filter to the produced voltage.

20. The method according to claim 11, and comprising, in response to the monitoring of the properties of the X-ray beam, adjusting a time interval in which the one or more of the measurement targets are positioned in the X-ray beam.

* * * * *